(12) United States Patent
Chanvillard

(10) Patent No.: US 8,177,930 B2
(45) Date of Patent: May 15, 2012

(54) PROCESS OF PRODUCTION AND STRUCTURAL ELEMENT

(75) Inventor: Gilles Chanvillard, Les Cavetières (FR)

(73) Assignee: LaFarge, Paris (FR)

( * ) Notice: Subject to any disclaimer, the term of this patent is extended or adjusted under 35 U.S.C. 154(b) by 181 days.

(21) Appl. No.: 12/520,280

(22) PCT Filed: Dec. 14, 2007

(86) PCT No.: PCT/FR2007/002072
§ 371 (c)(1),
(2), (4) Date: Jul. 1, 2009

(87) PCT Pub. No.: WO2008/087299
PCT Pub. Date: Jul. 24, 2008

(65) Prior Publication Data
US 2010/0068533 A1    Mar. 18, 2010

(30) Foreign Application Priority Data

Dec. 21, 2006   (FR) ..................................... 06 11197

(51) Int. Cl.
*E04F 13/02*   (2006.01)
*B29C 65/54*   (2006.01)
*B32B 37/00*   (2006.01)

(52) U.S. Cl. ........... 156/71; 156/182; 156/242; 156/281

(58) Field of Classification Search .................... 156/71, 156/182, 242, 281; 52/235, 251, 314, 316, 52/596
See application file for complete search history.

(56) References Cited

U.S. PATENT DOCUMENTS

| | | | |
|---|---|---|---|
| 3,258,888 A | 7/1966 | Lum | |
| 4,030,939 A * | 6/1977 | Mallow | 106/624 |

FOREIGN PATENT DOCUMENTS

| | | |
|---|---|---|
| EP | 0 518 777 | 12/1992 |
| EP | 0 934 915 | 8/1999 |
| EP | 1 605 110 A2 | 12/2005 |
| JP | 61261281 A * | 11/1986 |
| WO | WO 95/01316 | 1/1995 |
| WO | WO 95/01317 | 1/1995 |
| WO | WO 99/23046 | 5/1999 |
| WO | WO 99/28267 | 6/1999 |
| WO | WO 99/58468 | 11/1999 |
| WO | WO 01/58826 | 8/2001 |

OTHER PUBLICATIONS

English Abstract of JP 61-261281 (2011).*
English Translation of JP 61-261281.*

* cited by examiner

*Primary Examiner* — Sing P Chan
(74) *Attorney, Agent, or Firm* — Pillsbury Winthrop Shaw Pittman, LLP

(57) ABSTRACT

A process for the production of a structural element in which at least two units of concrete are assembled by gluing, the compressive strength of the concrete being greater than 80 MPa. A structural element includes at least two glued units of concrete, the compressive strength of the concrete being greater than 80 MPa.

14 Claims, 2 Drawing Sheets

PROCESS OF PRODUCTION AND STRUCTURAL ELEMENT

CROSS-REFERENCE TO RELATED APPLICATIONS

This is the U.S. National Stage of PCT/FR2007/002072, filed Dec. 14, 2007, which in turn claims priority to French Patent Application No. 0611197, filed Dec. 21, 2006, the entire contents of both applications are incorporated herein by reference in their entireties.

FIELD

This invention relates to a process of production and a structural element.

BACKGROUND

Structural elements exist, which may comprise metallic parts assembled together by bolting; structural elements also exist, which may comprise parts of wood assembled together by gluing. The document <<Structural response of slabs combining Ultra-High Performance Fibre Reinforced Concretes (UHPFRC) and reinforced concrete>> by Katrin Habel, Emmanuel Denarié and Eugen Brühwiler, dated in July 2005, mentions the work of Alaee and Karihaloo in 2003 on the repair of classic concrete structures by gluing a unit of Ultra-High Performance Fibred concrete to a unit of damaged classic concrete of the structure.

SUMMARY

There is a need for other types of structural elements and processes for the production of structural elements.

The technical problem aims at making structural elements for structures submitted to high stress. The applicant has observed that it is surprisingly possible to make such structural elements by gluing parts of concrete.

The invention relates to a process of production of a structural element in which at least two units of concrete are assembled by gluing, the compressive strength of the concrete being greater than 80 MPa.

According to a variant, the compressive strength of the concrete is greater than 90 MPa, preferably greater than 100 MPa.

According to a variant, the process comprises, before gluing the units, a step of making at least one of the units flat.

According to a variant, the process comprises a step of thermal treatment of at least one of the units.

According to a variant, the units are glued together on opposing faces, the process comprising a step of treatment of at least one side of at least one unit.

According to a variant, the step of treatment of at least one side of at least one of the units is done by sand blasting, grit blasting or application of a retarder then washing after making the unit.

According to a variant, the process comprises a step of reinforcing the structural element by an external or internal reinforcement to at least one of the units.

According to a variant, the concrete is a very high performance concrete.

According to a variant, the concrete is an ultra high performance concrete.

According to a variant, the concrete comprises fibres.

According to a variant, the concrete used will be described in the following.

The invention also relates to a structural element comprising at least two glued units, the compressive strength of the concrete being greater than 80 MPa.

According to a variant, the compressive strength of the concrete is greater than 90 MPa, preferably greater than 100 MPa.

According to a variant, the concrete is a very high performance concrete.

According to a variant, the concrete is an ultra-high performance concrete.

According to a variant, the concrete comprises fibres.

According to a variant, the fibres are of a material selected from the group comprising metallic material, mineral material or organic material.

According to a variant, the glue is structural glue.

According to a variant, the units comprise an internal or external reinforcement.

According to a variant, the interface between the units is a broken line in cross section.

According to a variant, the described element is obtained according to the previously-described process According to a variant, the concrete used will be described further below.

The invention also relates to the structural element obtained by the process described above.

BRIEF DESCRIPTION OF THE DRAWINGS

Other characteristics and advantages of the invention will appear after reading the detailed description that follows of the embodiments of the invention, given by way of example only and referring to the drawings that show.

DETAILED DESCRIPTION

The invention relates to a process of production of a structural element in which at least two units of concrete are assembled by gluing, the compressive strength of the concrete being greater than 80 MPa. The process provides an alternative to already known processes of production. The process makes it possible, in particular, to make a structural element more easily from unitary modules, which are simpler to produce. Furthermore, the fact of using a concrete with strengths greater than 80 MPa makes it possible to make units in which their own weight is lower, this makes it possible to reduce the permanent stress in the glue; the strength of the structural element is thus better than with a conventional concrete.

Figure 1:
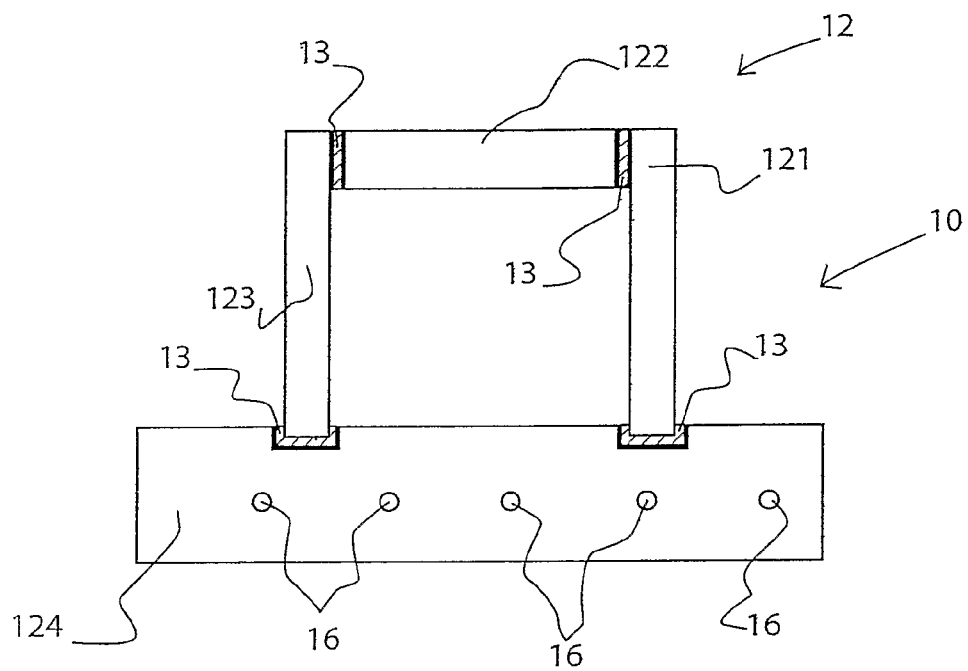
FIG. 1, an example of a structural element.

FIG. 1 shows a structural element 10. The element 10 comprises at least two units 12 glued together with joint glue 13. The units 12 are preferably of concrete, the compressive strength of the concrete is greater than 80 MPa; for example the concrete is a very-high performance concrete or an ultra-high performance fibre concrete, for which a definition will be provided further below. The element 10 is easily obtained because the units 12 are in an easily-obtainable shape. Indeed, the units 12 may have simple geometric shapes, which facilitate their individual construction; the units 12 are for example parallelepipeds for which the construction by formwork is simple to do.

By structural element is understood an assembly used in the construction of a structure. The structural element may notably be a beam. The structural element may also be an element of decoration or even a free-standing element in concrete with a specific function. The structural element is an assembly by gluing modules called units. These units may be made separately. The structural elements are generally submitted to very substantial stress.

The element 10 may comprise two units 12 or more glued together. The gluing of the units makes it possible to transmit from one unit to the other the stress sustained by the structural element 10. The assembly by gluing between the units makes it possible to transmit the tensile or compressive stress by means of the glue joint, acted on by shearing. The gluing hence ensures continuity in the transmission of stress from one unit to the other. In FIG. 1, the element 10 comprises four units 12, referenced as 121, 122, 123, 124. The element 10 is, for example a beam in which FIG. 1 is a transverse section. The units 12 may be parallelepipeds with several sides, the units being glued together according to one of their sides. The units 12 have at least one side partially glued to another unitary unit 12. The units 12 may also have several sides partially glued to other units 12. For example in FIG. 1, the unit 121 comprises one side turned towards the unit 122; the side of unit 121 is partially glued to the unit 122. The unit 122 is glued on two of its sides to the units 121 and 123 respectively. The units 121 and 123 are assembled to the unit 124 by gluing; in particular, the units 121 are 123 are attached to the unit 124 by recessed fitting. Two grooves are made on one of the sides of the unit 124, the units 121 and 123 being inserted and glued in these grooves.

The glue 13 used is for example structural glue (notably epoxy, polyurethane, or a mineral binder, such as for example a high performance or ultra-high performance concrete). Preferably one uses glue with a mineral binder base. According to a variant, preferably one uses epoxy glue. The structural glue has sufficient strength to make structural joints. An assembly glued with structural glue is capable of supporting considerable stress. One may use beforehand a primer between the unit and the glue, the primer improving the anchorage of the glue to the unit.

The process of production of the structural element comprises a step of gluing the units; this step is done by applying glue on the side of at least one of the two units. One may apply the glue (and the primer when required) on one of the two sides of the units to be glued; preferably, one applies the glue (and the primer when required) on the two sides of the units to be glued. Then, the two units are pressed against each other. For example, one of the units is placed on the other in such a way as to benefit from the weightlessness to favour the gluing. Alternatively, one may assemble the units vertically then horizontal pressure is exerted. In the two cases, pressure is exerted to eliminate all the excess glue. The advantage is that the assembly is easy because one can assemble units small in size that are easy to handle. Indeed, due to the use of concretes with strengths greater than 80 MPa, it is possible to make less voluminous units, which makes it possible to reduce the weight of the units; this makes it possible to handle the units without lifting means. This is more advantageous than conventional concretes for which the compressive strength is from 20 to 40 MPa and for which it is necessary to provide reinforcements; the use of such concretes generates greater volumes and weights, which make the units of such concretes more difficult to handle. Furthermore, the process makes it possible to locally reinforce the structural element. Indeed, the process makes it possible to adjoin supplementary units at a given location of the structural element. For example in FIG. 1, the unit 124 may be locally reinforced by gluing supplementary units. The advantage is thus to be able to thin the structural element in a location where the stress is greater.

Furthermore, it is possible to vary the thickness of the structural element in a simple manner without it being necessary to provide a sinuous formwork for the structural element. This also presents the advantage of being able to optimise the geometry of the final structural element.

The process further comprises, before gluing the units, a step of making at least one of the units of concrete flat. In the case where the concrete is fibred, this makes it possible to obtain an orthotropic direction of the fibres in the plane, which may be valuable in the design of a structural element assembled by gluing. For example in FIG. 1, the fibres are directed in the horizontal plane of the unit 124, which increases the flexural strength of the unit 124. The preferred direction of the fibres is obtained by a compromise between the fibred concrete mix design, the geometry of the units and the adopted mode of pouring. By pouring thin elements, flat with a mixture flowing in the lengthwise direction, the fibres will place themselves in the plane and will have an orthotropic direction. It is equally possible to make a unit of large dimensions and cut this unit into smaller-sized customised units, according to requirements. This makes it possible for example to make the large-sized unit at a certain location then transport it more easily once cut to the required dimension into smaller-sized units. The units may also be made on other ways; for example the units may be made by injection in a closed mould in any position, or by extrusion.

The process may comprise a step of thermal treatment of at least one of the units. This presents the advantage of accelerating the hydration mechanism of the binder and subsequently stabilising the shrinkage of the material. The units thus acquire their final dimension rapidly, which allows for an acceleration of the production of the structural element by gluing. This makes it possible to avoid wear and damage to the glue joints under the effect of the stress generated by the deferred restricted deformations which are inherent to concretes The process may also comprise, before the gluing, a step of treatment of at least one of the sides of at least one of the units to be glued. Preferably, the opposing faces of the units to be glued are treated. The treatment makes it possible to improve the adherence of the glue to the units; indeed, the surface treatment makes it possible to modify the state of the surface by eliminating the layer of skin created by the moulding of the unit. The treatment makes it possible to avoid the glue being applied on a smooth surface as it appears upon leaving the formwork of the unit; the treatment is a treatment that makes it possible to make the surface on which the glue is applied more rough. By way of example, the treatment is done by grit blasting or sand blasting. The advantage of sand blasting is that a better flatness of the surface of the treated unit is preserved; the advantage of the grit blasting is to obtain a rougher surface. It is also possible to use a hydration retarder during the production of the units. This retarder is spread on the moulds in places corresponding to the surfaces that will be glued. After formwork removal of the units, washing with a high-pressure water jet makes it possible to remove the moulded surface layer and obtain sufficient roughness for good gluing.

One or more units may comprise a reinforcement 16. This makes it possible to increase the strength of the unit(s), and hence increase the strength of the structural element. The reinforcement 16 may be metallic (metallic reinforcements) or composite (glass fibres, carbon fibres, coated with epoxy). This reinforcement 16 may be internal to at least one unit. This reinforcement 16 integrated within a unit may be passive or active (pre-stressed by pre-tension). The reinforcement 16 may also be external to at least one unit. In this last case, it is possible to reinforce the structural element by inserting the external reinforcement of the concrete when assembling by gluing. Metallic or composite plates may thus be glued. The external reinforcement 16 may also be added after the gluing of the concrete units. Pre-stressed cables by post tensioning may be inserted lengthwise along the glued structural element (either external or in cavities provided in the units during their production).

The concrete may contain fibres. The fibres used in the concrete may be metallic, organic or mineral fibres. The fibres make it possible to improve the transfer of stress between the concrete and the continuous reinforcement, in particular when the thicknesses of the concretes are low. The nature of the fibres used may vary from one unit to another according to the expected performances of each one. Mixtures of different types of fibres are possible During the assembly, one may dispose a variable number of units in the structural element, according to the mechanical stress that exist in the final structure.

Figure 2:
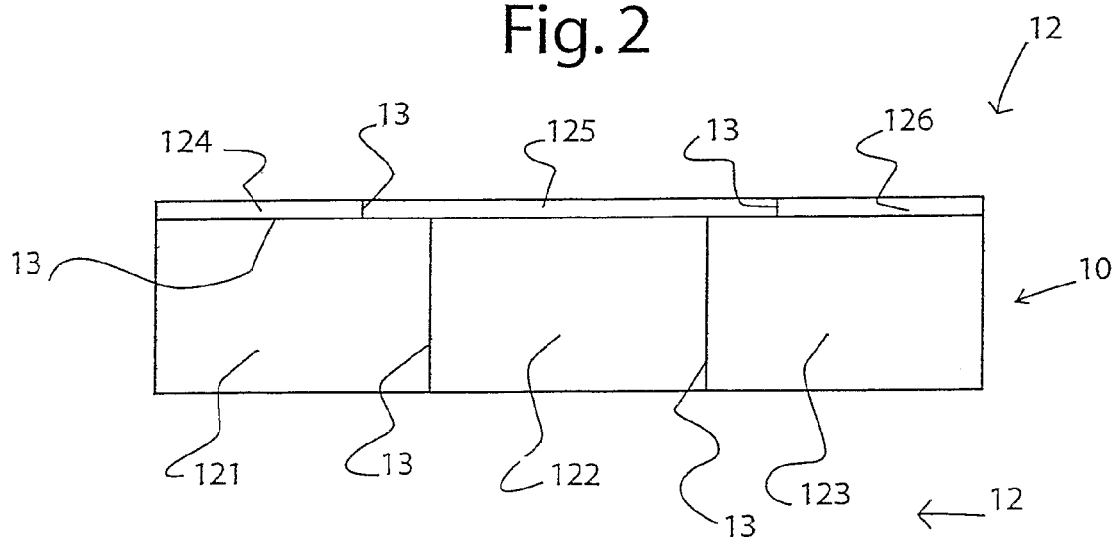
FIG. 2, another example of a structural element.

FIG. 2 shows another example of an embodiment of the structural element 10. The element 10 is another example of a beam obtained from units of a smaller dimension. The element 10 comprises the units 121, 122, 123, 124, 125, 126. The units 124, 125, 126 are for example less thick that the units 121, 122, 123. The units 121, 122, 123 are glued together by glue joints 13. The units 124, 125, 126 are also glued together by glue joints 13, but equally glued to the units 121, 122, 123 by glue joints 13. Preferably, the glue joints 13 between the units 121, 122, 123 are offset relative to the glue joints 13 between the units 124, 125, 126. This makes it possible to reinforce the gluing zones between the units 121, 122, 123. The units 121, 122, 123 make it possible to make for example a beam of a certain length, with unitary units of a smaller length, which facilitates the construction of the beam. The units 124, 125, 126 make it possible to reinforce and rigidify the beam constituted by the units 121, 122, 123; the use of the units 124, 125, 126 allows for easy gluing to the beam because they are easier to handle during the gluing. A reinforcement 16 may also be installed in one or several units.

The units are of concrete with a compressive strength greater than or equal to 80 MPa. Preferably the compressive strength is greater than 90 MPa, advantageously greater than 100 MPa. The concrete is for example very high performance concrete (abbreviated to VHPC). The units 12 may also be of ultra-high performance concrete, in particular ultra-high performance fibred concrete (abbreviated to UHPFC). The units 12 are for example at least 2 cm thick, preferably from 2 to 10 cm thick, preferably from 2 to 4 cm thick. This makes it possible to embed the reinforcements and place then as close as possible to the inside surface of the units. This makes it possible to favour the orthotropic direction of the fibres during pouring.

The ultra-high performance concretes comprise a cement matrix such as described below. Their compressive strength is greater than 80 MPa, preferably greater than 90 MPa, advantageously greater than 100 MPa.

The ultra-high performance fibred concretes are concretes with a cement matrix such as described below comprising fibres. Reference should be made to the document <<Bétons fibrés à ultra-hautes performance>> from the <<Service d'études techniques des routes et autoroutes>> (Setra) and the <<Association Française de Génie Civil>> (AFGC). The compressive strengths of these concretes are above 120 MPa, generally above 150 MPa. The fibres are metallic, organic or a mixture thereof. The dosage of binder is high (The W/C is low; generally the W/C is at the most approximately 0.3).

The cement matrix generally comprises cement (Portland), an element with a pozzolanic reaction (notably silica fume) and a fine sand. The respective dimensions are selected intervals, according to the nature and respective amounts. For example, the cement matrix may comprise:
  Portland cement
  fine sand
  an element of the silica fume type
  optionally quartz flour and/or a limestone filler
  the amounts being variable and the dimensions of the different elements being selected from the micron and submicron range and the millimeter, with a maximum dimension generally not exceeding 5 mm
  a superplasticizer being generally added with the mixing water.

As an example of a cement matrix, those described in the patent applications EP-A-518777, EP-A-934915, WO-A-9501316, WO-A-9501317, WO-A-9928267, WO-A-9958468, WO-A-9923046, WO-A-0158826 may be mentioned, in which further details may be found.

The fibres have length and diameter characteristics such that they effectively confer the expected mechanical characteristics. Their amount is generally low, for example from 1 to 8% by volume.

Examples of a matrix are RPC, Reactive Powder Concretes, while the examples of UHPFC are BSI by Eiffage, Ductal® by Lafarge, Cimax® by Italcementi and BCV by Vicat.

Specific examples are the following concretes:
1) those resulting from mixtures of
  a—a Portland cement selected from the group consisting of the ordinary Portland cements called "CPA", the high performance Portland cements called "CPA-HP", the high performance and rapid setting Portland cements called "CPA-HPR" and the Portland cements with a low level of tricalcium aluminate (C3A), of the normal or high performance and rapid setting types;
  b—a vitreous micro silica wherein the particles have for a major part a diameter of 100 Å-0.5 micron, obtained as a by-product in the zirconium industry, the proportion of this silica being from 10 to 30 weight % of the weight of the cement;
  c—a water-reducing superplasticizer and/or fluidizing agent in an overall proportion from 0.3% to 3% (weight of the dry extract relative to the weight of the cement);
  d—a quarry sand comprising particles of quartz which have for a major part a diameter of 0.08 mm-1.0 mm;
  e—optionally other admixtures.
2) those resulting from the mixture of:
  a—a cement with a particle size corresponding to a mean harmonic diameter or equal to 7 µm, preferably from 3 to 7 µm;
  b—a mixture of calcined bauxite sands with different particle sizes, the finest sand having an average particle size lower than 1 mm and the coarsest sand having an average particle size lower than 10 mm;
  c—silica fume wherein 40% of the particles have a dimension lower than 1 µm, the mean harmonic diameter being about 0.2 µm, and preferably 0.1 µm;
  d—an anti-foaming agent;
  e—a water-reducing superplasticizer;
  f—optionally fibres;
  and water;
  the cements, the sands and the silica fume presenting a particle size such that there are at least three and at most five different particle size classes, the ratio between the mean harmonic diameter of one particle size class and the class immediately above being approximately 10.

3) those resulting from the mixture of:
a—a Portland cement;
b—granular elements;
c—fine elements with a pozzolanic reaction;
d—metallic fibres;
e—dispersing agent;
and water;
the preponderant granular elements having a maximum particle size D at most equal to 800 micrometers, wherein the preponderant metallic fibres have an individual length 1 of 4 mm-20 mm, wherein the ratio R between the average length L of the fibres and the aforesaid maximum size D of the granular elements is at least equal to 10 and wherein the quantity of preponderant metallic fibres is such that the volume of these fibres is from 1.0% to 4.0% of the volume of the concrete after setting.

4) those resulting from the mixture of:
a—100 p. of Portland cement;
b—30 to 100 p., or better 40 to 70 p., of fine sand having a particle size of at least 150 micrometers;
c—10 to 40 p. or better 20 to 30 p. of amorphous silica having a particle size lower than 0.5 micrometers;
d—20 to 60 p. or better 30 to 50 p., of ground quartz having a particle size lower than 10 micrometers;
e—25 to 100 p., or better 45 to 80 p. of steel wool;
f—a fluidizer,
g—13 to 26 p., or better 15 to 22 p., of water.
Thermal curing is included.

5) those resulting from the mixture of:
a—cement;
b—granular elements having a maximum particle size Dmax of at most 2 mm, preferably at most 1 mm;
c—elements with a pozzolanic reaction having an elementary particle size of at most 1 µm preferably at most 0.5 µm;
d—constituents capable of improving the toughness of the matrix selected from acicular or plate-like elements having an average size of at most 1 mm, and present in a volume proportion from 2.5 to 35% of the combined volume of the granular elements (b) and the elements with a pozzolanic reaction (c);
e—at least one dispersing agent and meeting the following conditions:
(1) the weight percentage of water W relative to the combined weight of the cement (a) and the elements (c) is 8-24%; (2) the fibres present an individual length l of at least 2 mm and a ratio l/phi, phi being the diameter of the fibres, of at least 20; (3) the ratio R between the average length L of the fibres and the maximum particle size Dmax of the granular elements is at least 10; (4) the quantity of fibres is such that their volume is lower than 4% preferably than 3.5% of the volume of concrete after setting.

6) those resulting from the mixture of:
a—cement;
b—granular elements;
c—elements with a pozzolanic reaction having an elementary particle size of at most 1 µm, preferably at most 0.5 µm;
d—constituents capable of improving the toughness of the matrix selected from acicular or plate-like elements having an average size of at most 1 mm, and present in a volume proportion from 2.5 to 35% of the combined volume of the granular elements (b) and the elements with a pozzolanic reaction (c);
e—at least one dispersing agent and meeting the following conditions:
(1) the weight percentage of the water W relative to the combined weight of the cement (a) and the elements (c) is in the range 8-24%; (2) the fibres have an individual length l of at least 2 mm and a ratio l/phi, phi being the diameter of the fibres, of at least 20; (3) the ratio R between the average length L of the fibres and the particle size D75 of all the constituents (a), (b), (c) and (d) is at least 5, preferably at least 10; (4) the quantity of fibres is such that their volume is lower than 4% and preferably than 3.5% of the volume of the concrete after setting; (5) all the constituents (a), (b), (c) and (d) having a particle size D75 of at most 2 mm, preferably of at most 1 mm, and a particle size D50 of at most 200 µm, preferably of at most 150 µm.

7) those resulting from the mixture of:
a—cement;
b—granular elements having a maximum particle size D of at most 2 mm, preferably of at most 1 mm;
c—fine elements with a pozzolanic reaction having an elementary particle size of at most 20 µm, preferably of at most 1 µm;
d—at least one dispersing agent;
and meeting the following conditions: (e) the weight percentage of the water relative to the combined weight of the cement (a) and the elements (c) is from 8 to 25%; (f) the organic fibres have an individual length l of at least 2 mm and a ratio l/phi, phi being the diameter of the fibres, of at least 20; (g) the ratio R between the average length L of the fibres and the maximum particle size D of the granular elements is at least 5, (h) the quantity of fibres is such that their volume represents at most 8% of the volume of the concrete after setting.

8) those resulting from the mixture of:
a—cement;
b—granular elements;
c—elements with a pozzolanic reaction having an elementary particle size of at most 1 µm, preferably of at most 0.5 µm;
d—at least one dispersing agent;
and meeting the following conditions: (1) the weight percentage of the water W relative to the combined weight C of the cement (a) and the elements (c) is in the range 8-24%; (2) the fibres have an individual length l of at least 2 mm and a ratio l/phi, phi being the diameter of the fibres, of at least 20; (3) the ratio R between the average length L of the fibres and the particle size D75 of all the constituents (a), (b) and (c) is at least 5, preferably at least 10; (4) the quantity of fibres is such that their volume is at most 8% of the volume of the concrete after setting; (5) all the constituents (a), (b) and (c) have a particle size D75 of at most 2 mm, preferably at most 1 mm, and a particle size D50 of at most 150 µm, preferably at most 100 µm.

9) those resulting from the mixture of
a—at least one hydraulic binder from the group consisting of the Portland cements class G (API), the Portland cements class H (API) and other hydraulic binders with low levels of aluminates,
b—a micro silica with a particle size of 0.1 to 50 micrometers, at a rate of 20 to 35 weight % relative to the hydraulic binder,
c—an addition of medium mineral and/or organic particles, with a particle size of 0.5-200 micrometers, at a rate of 20 to 35 weight % relative to the hydraulic binder, the quantity of the aforesaid addition of medium particles being less than or equal to the quantity of micro silica, a superplasticizing agent and/or a water-soluble fluidizer in a proportion of 1% to 3 weight % relative to the hydraulic binder, and
water in an amount at the most equal to 30 weight % of the hydraulic binder.

10) those resulting from the mixture of:
a—cement;
b—granular elements having a particle size Dg of at most 10 mm;
c—elements with a pozzolanic reaction having an elementary particle size from 0.1 to 100 µm;
d—at least one dispersing agent;
e—metallic and organic fibres;
and meeting the conditions: (1) the weight percentage of water relative to the combined weight of the cement (a) and the elements (c) is in the range 8-24%; (2) the metallic fibres have an average length Lm of at least 2 mm, and a ratio Lm/d1, d1 being the diameter of the fibres, of at least 20; (3) the ratio Vi/V of the volume Vi of the metallic fibres to the volume V of the organic fibres is greater than 1, and the ratio Lm/Lo of the length of the metallic fibres to the length of the organic fibres is greater than 1; (4) the ratio R between the average length Lm of the metallic fibres and the size Dg of the granular elements is at least 3; (5) the quantity of metallic fibres is such that their volume is less than 4% of the volume of the concrete after setting and (6) the organic fibres have a melting temperature lower than 300° C., an average length Lo greater than 1 mm and a diameter Do of at most 200 µm, the amount of organic fibres being such that their volume is from 0.1 to 3% of the volume of the concrete.

As mentioned above, a thermal treatment (or cure) can be done on these concretes. For example, the thermal curing comprises, after the hydraulic setting, heating to a temperature of 90° C. or more for several hours, typically 90° C. for 48 hours.

The examples of fibres are given relative to the UHPFC, but they apply to the previously-described concretes, in particular the very high performance concrete.

Figure 3:
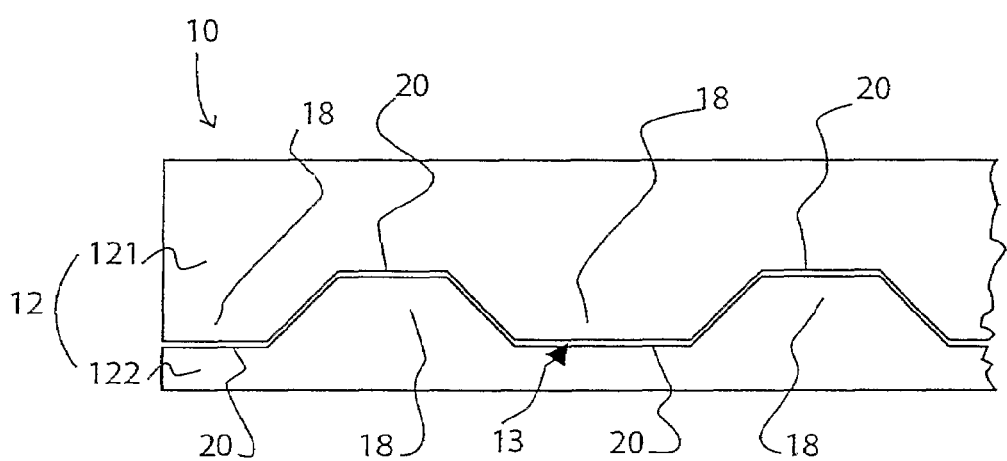
FIG. 3, an example of an interface within the structural element.

FIG. 3 shows an example of an interface within the structural element 10. The interface is between the two units 12 referenced 121 and 122. The interface is the application zone of the glue 13. The interface may be of different shapes. It may be a plane, the sides of the units facing each other being flat. In FIGS. 1 and 2 the interface between the units is flat and perpendicular to the plane of the figures; the interface may also be inclined relative to the one illustrated. In FIG. 3, the structural element 10 is represented in cross section, the interface being a broken line (shear key). The units comprise grooves 18 and channels 20 respectively cooperating with channels 20 and grooves 18 of a facing unit. This allows for the passage by a mechanical effect (gear effect) of the shear stress thus relieving the strain in the glue 13.

EXAMPLES

Tests with Different Types of Glue

TABLE 1 test conditions

| | Number of specimens | Surface treatment | Gluing system |
|---|---|---|---|
| Series 1 | 3 | Sand blasting | Epoxy primer (Sikafloor ®) + epoxy glue (Sikadur ®-30) + 48 hours immersions in water at 60° C. |
| Series 2 | 3 | Sand blasting | Epoxy primer (Sikafloor ®) + polyurethane glue (Sikaforce 7750) |
| Series 3 | 3 | Sand blasting | 7 days curing at 20° C., Sand blasting and gluing by mineral binder (premix 1) |
| Series 4 | 3 | Sand blasting | Sand blasting after 7 days, 35 days curing at 20° C., and gluing by mineral binder (premix 1) |

Production of Test Bodies

The units of UHPC are made with a base mix design (premix 1: see table 2) comprising 2% of metallic fibres.

TABLE 2

Composition of premix 1

| Component | Relative quantity |
|---|---|
| Cement - CEM I type | 1 |
| Silica fume | 0.25 |
| Limestone filler | 0.3 |
| Siliceous-limestone sand (Dmax = 1.5 mm) | 1.37 |
| Superplasticizer - PCP type | 0.013 |
| W/C | 0.2 |

The moulds used were of steel. The specimens were demoulded after 7 days. No specific treatment was done. The average compressive strengths measured after 28 days on specimens with a 70 mm diameter were 152±6 MPa for all the series. The surface treatment by sand blasting was done after demoulding after 7 days.

24 hours after the application of the primer, the units were then glued using the glue. A double gluing operation was done (application of the glue on the two sides of the concrete to be assembled). The specimens were then assembled vertically then horizontal pressure was exerted to eliminate all the excess glue. The average thickness of the joints was evaluated at 0.8 mm for series 1 and 3, 0.5 mm for series 2 and 2 mm for series 4.

The specimens in series 1 were kept at 60° C.±2 temperature in water for 48 hours, then they were tested (after 28 days).

The specimens in series 2 were kept at 20° C. for 7 days then they were tested after 28 days.

The specimens in series 3 were sand-blasted then glued after 7 days, stored in water for 7 days, then tested after 28 days.

For the last series, the specimens were sand-blasted after 7 days, glued after 35 days and tested after 65 days.

TABLE 3

Description of the production schedule and curing of each series

| | Cure | Sand blasting | Gluing | Strength measurements |
|---|---|---|---|---|
| Series 1 | 7 days at 20° C. + 48 hours at 60° C./100% humidity | 7 days | 7 days | 28 days |
| Series 2 | 7 days at 20° C. | 7 days | 7 days | 28 days |
| Series 3 | 7 days at 20° C. + 7 days at 20° C./100% humidity + 14 days at 20° C. | 7 days | 7 days | 28 days |
| Series 4 | 28 days at 20° C. | 7 days | 35 days | 65 days |

Instrumentation

Instrumentation makes it possible to evaluate the average slip along the length of the glue joint while it is loaded by LVDT (Linear Variable Differential Transformer) inductive displacement sensors of the brand RDP®, stroke sensors±5 mm, precision $10^{-3}$ mm. This sensor is disposed between the parts 123 and 122 in FIG. 1.

A force sensor 1000 kN, precision±1 kN, is disposed between the press and the top of the central unit of concrete (above the element 122 in FIG. 1). the acquired information by the various sensors were recorded by a Vishay 4000 acquisition chain with a frequency of 1 recording per second throughout the loading The latter is driven by displacement at a load increase speed of 0.5 mm/min.

TABLE 4

Results of series 1 to 4

| Series | Specimen | Force (kN) | Stress (MPa) | Slip (mm) |
|---|---|---|---|---|
| 1 | 1A | 196.2 | 9.81 | 0.094 |
|  | 1B | 197.7 | 9.885 | 0.098 |
|  | 1C | 190 | 9.5 | 0.096 |
|  | Average | 194.6 | 9.7 | 0.096 |
|  | Standard deviation | 4.1 | 0.2 | 0.002 |
| 2 | 2A | 23.6 | 1.18 | 0.485 |
|  | 2B | 23.12 | 1.156 | 0.468 |
|  | 2C | 22.12 | 1.106 | 0.513 |
|  | Average | 22.9 | 1.1 | 0.489 |
|  | Standard deviation | 0.8 | 0.0 | 0.023 |
| 3 | 3A | 113 | 5.65 | 0.019 |
|  | 3B | 111.15 | 5.5575 | 0.0215 |
|  | 3C | 110.81 | 5.5405 | 0.023 |
|  | Average | 111.7 | 5.6 | 0.021 |
|  | Standard deviation | 1.2 | 0.1 | 0.002 |
| 4 | 4A | 40.1 | 2.005 | — |
|  | 4B | 43 | 2.15 | — |
|  | 4C | 38 | 1.9 | — |
|  | Average | 40.4 | 2.0 | — |
|  | Standard deviation | 2.5 | 0.1 | — |

The use of supple polyurethane glue makes it possible to obtain an assembly 5 times more supple but however, it presents strengths 9 times lower relative to the epoxy glue. The average strength at the failure point with the polyurethane glue was 1.1 MPa and 9.7 MPa for the epoxy glue.

Inasmuch as the mineral gluing elaborated from premix 1 is concerned, the average strength at the failure point was 5.6 MPa with a very substantial rigidity of the assembly (3 times greater than that of the epoxy gluing). Furthermore an elastic-fragile type of behaviour of the assembly was noted.

As to the last series, the mineral gluing done 28 days after pouring of the parts did not reach the same level of performance as those in series 3. It would seem therefore that it is necessary to do the gluing operation rapidly after demoulding the parts, that is, during the first days that follow the production of the parts to be assembled.

As a conclusion it is possible to glue units of concrete to obtain structural elements resisting to substantial stress. Furthermore, it is possible to use different types of glues, each one having its advantages and disadvantages adapted to different situations.

The invention claimed is:

1. A process for the production of a structural element comprising assembling at least two units of concrete by gluing the at least two units of concrete together, the compressive strength of the concrete of each of the at least two units being greater than 80 MPa, the concrete of the at least two units being such that the compressive strength greater than 80 MPa is obtained without subjecting the concrete to a heat treatment or by thermally curing the concrete at a temperature lower than about 100° C.

2. The process according to claim 1, wherein the concrete used has a compressive strength greater than 90 MPa.

3. The process according to claim 2, wherein the concrete used has a compressive strength greater than 100 MPa.

4. The process according to claim 1 comprising, before the gluing of the units, making at least one of the unit flat.

5. The process according to claim 1, comprising thermally curing at least one of the units at a temperature of about 90° C.

6. The process according to claim 1, wherein the units are glued together by their opposing faces, the process comprising treating at least one of the sides of at least one of the units.

7. The process according to claim 6, wherein treating at least one side of at least one of the units is done by sand-blasting, grit-blasting or application of a retarder then washing after making the unit.

8. The process according to claim 1, comprising reinforcing the structural element by an external or internal reinforcement of at least one of the units.

9. The process according to claim 1, the concrete being a very high performance concrete.

10. The process according to claim 1, the concrete being an ultra-high performance concrete.

11. The process according to claim 1, the concrete comprising fibres.

12. The process according to claim 1, wherein the concrete is the result of
1) the mixture of
a—a Portland cement selected from the group consisting of the ordinary Portland cements called "CPA", the high performance Portland cements called "CPA-HP", the high performance and rapid setting Portland cements called "CPA-HPR" and the Portland cements with a low level of tricalcium aluminate (C3A), of the normal or high performance and rapid setting type;
b—a vitreous micro silica wherein the particles have for a major part a diameter of 100 Å-0.5 micron, obtained as a by-product in the zirconium industry, the proportion of this silica being from 10 to 30 weight % of the weight of the cement;
c—a water-reducing superplasticizer and/or fluidizing agent in an overall proportion from 0.3% to 3% (weight of the dry extract relative to the weight of the cement);
d—a quarry sand comprising particles of quartz which have for a major part a diameter of 0.08 mm-1.0 mm;
e—optionally other admixtures; or
2) the mixture of
a—a cement with a particle size corresponding to a mean harmonic diameter or equal to 7 µm, preferably from 3 to 7 µm;
b—a mixture of calcined bauxite sands with different particle sizes, the finest sand having an average particle size lower than 1 mm and the coarsest sand having an average particle size lower than 10 mm;
c—silica fume wherein 40% of the particles have a dimension less than 1 µm, the mean harmonic diameter being about 0.2 µm, and preferably 0.1 µm;
d—an anti-foaming agent;
e—a water-reducing superplasticizer;
f—optionally fibres;
and water;
the cements, the sands and the silica fume presenting a particle size such that there are at least three and at most five different particle size classes, the ratio between the mean harmonic diameter of one particle size class and the class immediately above being approximately 10; or
3) the mixture of
a—a Portland cement;
b—granular elements;
c—fine elements with a pozzolanic reaction;
d—metallic fibres;
e—a dispersing agent;
and water;
the preponderant granular elements having a maximum particle size D at most equal to 800 micrometers, wherein the preponderant metallic fibres have an individual length l of 4mm-20 mm, wherein the ratio R between the average length L of the fibres and the aforesaid maximum size D of the granular elements is at least equal to 10 and wherein the quantity of preponderant metallic fibres is such that the volume of these fibres is from 1.0% to 4.0% of the volume of the concrete after setting; or 4) the mixture of
a—100 p. of Portland cement;
b—30 to 100 p., or better 40 to 70 p., of fine sand having a particle size of at least 150 micrometers;
c—10 to 40 p. or better 20 to 30 p. of amorphous silica having a particle size lower than 0.5 micrometers;
d—20 to 60 p. or better 30 to 50 p., of ground quartz having a particle size lower than 10 micrometers;
e—25 to 100 p., or better 45 to 80 p. of steel wool;
f—a fluidizer,
g—13 to 26 p., or better 15 to 22 p., of water, a thermal cure being included; or 5) the mixture of
a—cement;
b—granular elements with a maximum particle size Dmax of at most 2 mm, preferably at most 1 mm;
c—elements with a pozzolanic reaction having an elementary particle size of at most 1 μm, preferably at most 0.5 μm;
d—constituents capable of improving the toughness of the matrix selected from acicular or plate-like elements having an average size of at most 1 mm, and present in a volume proportion from 2.5 to 35% of the combined volume of the granular elements (b) and elements with a pozzolanic reaction (c);
e—at least one dispersing agent and meeting the following conditions:
(1) the weight percentage of the water W relative to the combined weight of the cement (a) and the elements (c) is 8-24%; (2) the fibres have an individual length l of at least 2 mm and a ratio l/phi, phi being the diameter of the fibres, of at least 20; (3) the ratio R between the average length L of the fibres and the maximum particle size Dmax of the granular elements is at least 10; (4) the quantity of fibres is such that their volume is less than 4% preferably than 3.5% of the volume of concrete after setting; or 6) the mixture of
a—cement;
b—granular elements;
c—elements with a pozzolanic reaction having an elementary particle size of at most 1 μm, preferably of at most 0.5 μm;
d—constituents capable of improving the toughness of the matrix selected from acicular or plate-like elements with an average size of at most 1 mm, and present in a volume proportion from 2.5 to 35% of the combined volume of the granular elements (b) and the elements with a pozzolanic reaction (c);
e—at least one dispersing agent;
and meeting the following conditions: (1) the weight percentage of the water W relative to the combined weight of the cement (a) and the elements (c) is in the range of 8-24%; (2) the fibres have an individual length l of at least 2 mm and a ratio l/phi, phi being the diameter of the fibres, of at least 20; (3) the ratio R between the average length L of the fibres and the particle size D75 of all the constituents (a), (b), (c) and (d) is at least 5, preferably at least 10; 4) the quantity of fibres is such that their volume is less than 4% and preferably than 3.5% of the volume of the concrete after setting; (5) all the constituents (a), (b), (c) and (d) have a particle size D75 of at most 2 mm, preferably, of at most 1 mm, and a particle size D50 of at most 200 μm, preferably of at most 150 μm; or 7) the mixture of
a—cement;
b—granular elements having a maximum particle size D of at most 2 mm, preferably of at most 1 mm;
c—fine elements with a pozzolanic reaction having an elementary particle size of at most 20 μm, preferably of at most 1 μm;
d—at least one dispersing agent;
and meeting the following conditions: (e) the weight percentage of the water relative to the combined weight of the cement (a) and the elements (c) is from 8 to 25%; (f) the organic fibres have an individual length l of at least 2 mm and a ratio l/phi, phi being the diameter of the fibres, of at least 20; (g) the ratio R between the average length L of the fibres and the maximum particle size D of the granular elements is at least 5, (h) the quantity of fibres is such that their volume represents at most 8% of the volume of the concrete after setting; or 8) the mixture of
a—cement;
b—granular elements;
c—elements with a pozzolanic reaction having an elementary particle size of at most 1 μm, preferably of at most 0.5 μm;
d—at least one dispersing agent;
and meeting the following conditions: (1) the weight percentage of the water W relative to the combined weight C of the cement (a) and the elements (c) is in the range of 8-24%; (2) the fibres have an individual length l of at least 2 mm and a ratio l/phi, phi being the diameter of the fibres, of at least 20; (3) the ratio R between the average length L of the fibres and the particle size D75 of all the constituents (a), (b) and (c) is at least 5, preferably at least 10; (4) the quantity of fibres is such that their volume is at most 8% of the volume of the concrete after setting; (5) all the constituents (a), (b) and (c) have a particle size D75 of at most 2 mm, preferably of at most 1 mm, and a particle size D50 of at most 150 μm, preferably of at most 100 μm; or 9) the mixture of:
a—at least one hydraulic binder from the group consisting of the Portland cements class G (API), the Portland cements class H (API) and other hydraulic binders with low levels of aluminates,
b—a micro silica with a particle size of 0.1 to 50 micrometers, from 20 to 35 weight % relative to the hydraulic binder,
c—an addition of medium mineral and/or organic particles, with a particle size in the range of 0.5-200 micrometers at a rate of from 20 to 35 weight % relative to the hydraulic binder, the quantity of the aforesaid addition of medium particles being less than or equal to the quantity of micro silica, a superplasticizing agent and/or a water-soluble fluidizer in a proportion from 1% to 3 weight % relative to the hydraulic binder, and water in an amount at most equal to 30% of the weight of the hydraulic binder; or 10) the mixture of:
a—cement;
b—granular elements having a particle size Dg of at most 10 mm;
c—elements with a pozzolanic reaction having an elementary particle size from 0.1 to 100 μm;
d—at least one dispersing agent;
e—metallic and organic fibres;
and meeting the conditions: (1) the weight percentage of the water relative to the combined weight of the cement (a) and the elements (c) is in the range of 8-24%; (2) the metallic fibres have an average length Lm of at least 2 mm, and a ratio Lm/dl, dl being the diameter of the fibres, of at least 20; (3) the ratio Vi/V of the volume Vi of the metallic fibres to the volume V of the organic fibres is greater than 1, and the ratio Lm/Lo of the length of the metallic fibres to the length of the organic fibres is greater than 1; (4) the ratio R between the average length Lm of the metallic fibres and the size Dg of the granular elements is at least 3; (5) the quantity of metallic fibres is such that their volume is less than 4% of the volume of the concrete after setting and (6) the organic fibres have a melting temperature lower than 300° C., an average length Lo great than 1 mm and a diameter Do of at most 200 μm, the quantity of organic fibres being such that their volume is from 0.1 to 3% of the volume of the concrete.

13. The process according to claim 1, wherein the assembling comprises roughening a side of at least one of the two units and applying a glue in contact with concrete on the roughened side before contacting said side with the other one of the two units.

14. The process according to claim 1, wherein said gluing is carried out using a glue, said glue and said concrete being made with a same material, and wherein said gluing is carried out without subjecting the glue to a heat treatment or by optionally applying a thermal curing at a temperature lower than about 100° C.

* * * * *